United States Patent
Gil Casals

(10) Patent No.: US 11,221,230 B2
(45) Date of Patent: Jan. 11, 2022

(54) SYSTEM AND METHOD FOR LOCATING THE POSITION OF A ROAD OBJECT BY UNSUPERVISED MACHINE LEARNING

(71) Applicants: Continental Automotive France, Toulouse (FR); Continental Automotive GmbH, Hannover (DE)

(72) Inventor: Silvia Gil Casals, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/271,310

(22) PCT Filed: Sep. 10, 2019

(86) PCT No.: PCT/EP2019/074125
§ 371 (c)(1),
(2) Date: Feb. 25, 2021

(87) PCT Pub. No.: WO2020/053221
PCT Pub. Date: Mar. 19, 2020

(65) Prior Publication Data
US 2021/0190536 A1    Jun. 24, 2021

(30) Foreign Application Priority Data
Sep. 11, 2018    (FR) ........................................ 1858120

(51) Int. Cl.
*G01C 21/00* (2006.01)
*G01V 8/10* (2006.01)
*G06K 9/00* (2006.01)

(52) U.S. Cl.
CPC ..... *G01C 21/3841* (2020.08); *G01C 21/3815* (2020.08); *G01V 8/10* (2013.01); *G06K 9/00791* (2013.01)

(58) Field of Classification Search
CPC .. G01C 21/3841; G01C 21/3815; G01V 8/10; G06K 9/00791
See application file for complete search history.

(56) References Cited

U.S. PATENT DOCUMENTS

| | | | |
|---|---|---|---|
| 10,489,972 B2 * | 11/2019 | Atsmon | G05D 1/0088 |
| 2017/0343382 A1 | 11/2017 | Shen et al. | |
| 2018/0120857 A1 | 5/2018 | Kappauf et al. | |

FOREIGN PATENT DOCUMENTS

| | | | | |
|---|---|---|---|---|
| FR | 1258099 A | * | 4/1961 | ............... C08K 3/40 |
| FR | 2979987 A1 | * | 3/2013 | ............. G01C 21/32 |
| FR | 2979987 A1 | | 3/2013 | |

OTHER PUBLICATIONS

International Search Report and Written Opinion for International Application No. PCT/EP2019/074125, dated Nov. 29, 2019, with partial English translation, 9 pages.

(Continued)

*Primary Examiner* — Nga X Nguyen
(74) *Attorney, Agent, or Firm* — RatnerPrestia

(57) ABSTRACT

The present disclosure concerns systems, methods and a set of computer programs for precisely locating the position of at least one road object associated with a portion of a road network. The general principle of the disclosure is based on determining the position of a road object using unsupervised classification based on distribution density. In the disclosure, the classification is applied in two phases. In the first phase, it is applied a first time to the plurality of geographic coordinates associated with a road object so as to automatically group it into homogeneous classes. In the second phase, it is applied a second time to each class produced in the first phase, so as to automatically group it into homogeneous subclasses based on the azimuth angles of the road object that are associated with the geographic coordinates of the class.

12 Claims, 2 Drawing Sheets

(56) References Cited

OTHER PUBLICATIONS

International Search Report and Written Opinion for International Application No. PCT/EP2019/074125, dated Nov. 29, 2019, 13 pages (French).
English Translation of the Written Opinion for International Application No. PCT/EP2019/074125 dated Nov. 29, 2019, 6 pages.

* cited by examiner

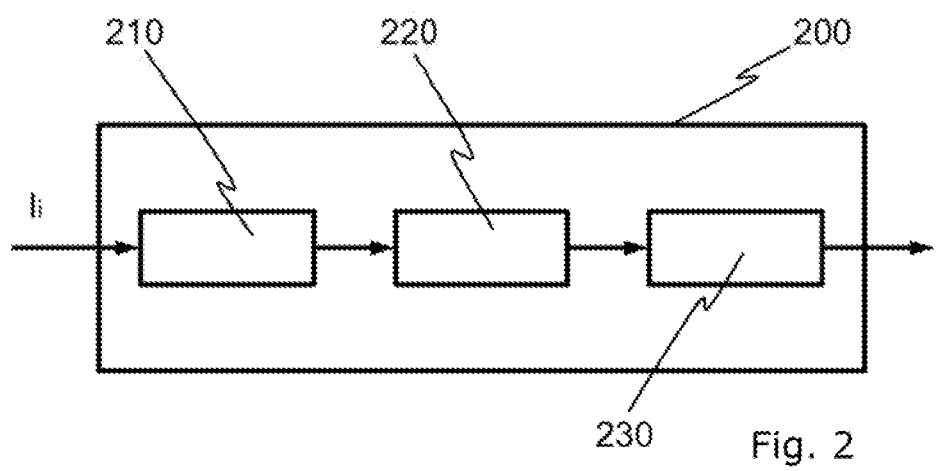
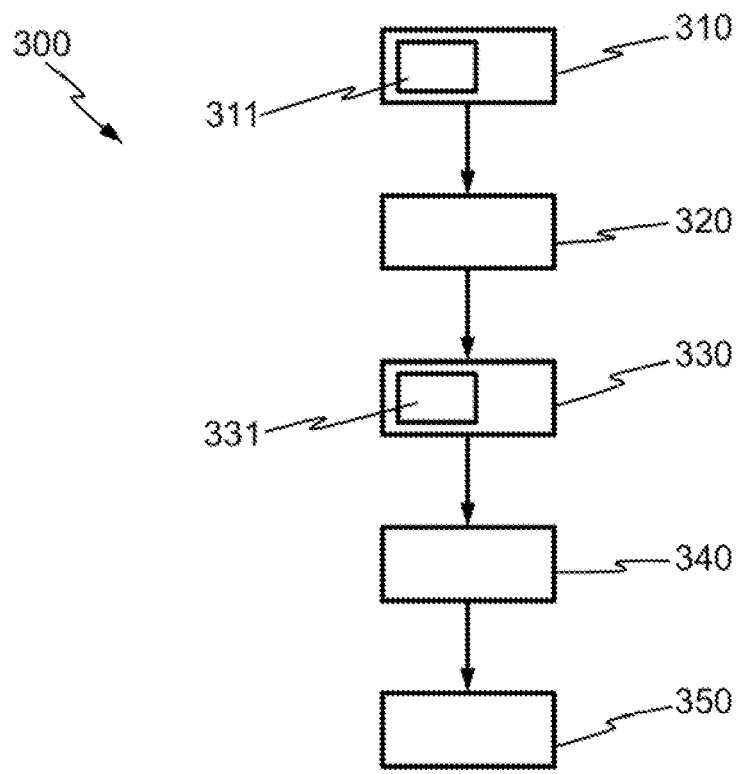

SYSTEM AND METHOD FOR LOCATING THE POSITION OF A ROAD OBJECT BY UNSUPERVISED MACHINE LEARNING

CROSS REFERENCE TO RELATED APPLICATIONS

This application is the U.S. National Phase Application of PCT International Application No. PCT/EP2019/074125, filed Sep. 10, 2019, which claims priority to French Patent Application No. 1858120, filed Sep. 11, 2018, the contents of such applications being incorporated by reference herein.

FIELD OF THE INVENTION

The present invention relates to the field of locating road objects associated with a portion of a road network. More specifically, it concerns systems, methods and a set of computer programs for precisely locating the position of at least one road object associated with a portion of a road network.

BACKGROUND OF THE INVENTION

Many applications require precise location of vertical road signage objects (e.g. a traffic sign) and horizontal road signage objects (e.g. a road marking). It is possible to cite, for example, driving assistance, road asset management, road safety or the development of multimedia tools for 3D geographic navigation.

In this context, updating mapping systems in real time is one of the key aspects for the navigation of "connected" and self-driving road vehicles. Increasing numbers of road vehicles are equipped with cameras, radars, lidars and various sensors allowing the detection of information from the road, such as for example cameras for the detection of traffic signs or markings on the road, suspension sensors for the detection of speed bumps or potholes, the detection of accidents due to emergency braking or avoidance, the detection of the presence of ice, gravel or objects on the road. The transmission of the information from these sensors coupled with the geographic position (for example, a GPS position) of the road vehicles would allow the mapping systems to be updated in real time.

However, two problems prevent straightforward implementation: GPS-type geolocation systems remain imprecise and some of the detections may be false positives.

There is then some uncertainty as to the actual position of the road objects, which is not acceptable for the applications mentioned above.

SUMMARY OF THE INVENTION

An aspect of the present invention therefore aims to eliminate, at least partially, the drawbacks mentioned above. To that end, in a first aspect of the invention, the invention proposes a system for locating the position of at least one road object associated with a portion of a road network.

Lastly, in a second aspect of the invention, there is proposed a method for locating the position of at least one road object, the method being usable in the system of the first aspect of the invention.

To that end, an aspect of the invention concerns a system for locating the position of at least one road object associated with a portion of a road network. The system comprises a road information receiving unit, a road information processing unit and a computing unit. The road information receiving unit is configured to receive a plurality of geolocated road information items which relate to the road object, the plurality of road information items being obtained from at least one sensor associated with each one of a plurality of road vehicles. The road information processing unit is configured to identify the type of the road object from the plurality of road information items and to calculate a plurality of geographic coordinates associated with the road object, each geographic coordinate being calculated from the plurality of road information items associated with one of the plurality of road vehicles. The computing unit is configured to:

- create, in a first creation step, for each type of road object, a first characteristic vector comprising the type of the road object and the associated plurality of geographic coordinates,
- partition, in a first partitioning step, on the basis of an unsupervised classification algorithm based on distribution density, at least a portion of the set of first characteristic vectors into a plurality of classes, and
- calculate, in a calculating step, for each class, at least one measure of central tendency from the geographic coordinates associated with the class, the measure of central tendency being representative of the position of the road object.

In one particular implementation of the invention, the computing unit is further configured, for each class, to:

- create, in a second creation step, a second characteristic vector comprising at least one component for each geographic coordinate of the class, each component being representative of an azimuth angle of a direction of observation of the road object associated with the corresponding geographic coordinate,
- partition, in a second partitioning step, on the basis of the unsupervised classification algorithm based on distribution density, at least a portion of the set of second characteristic vectors into a plurality of subclasses, and
- calculate, in the calculating step, for each subclass, at least one measure of central tendency from the geographic coordinates associated with the subclass, the measure of central tendency being representative of the position of the road object in a direction of observation of the road object.

According to a first embodiment, the computing unit is further configured to separate, in a first separation step of the first creation step, each geographic coordinate into a position component in terms of latitude and a position component in terms of longitude.

According to a second embodiment, the computing unit is further configured to separate, in a second separation step of the second creation step, each azimuth angle into an angular component in terms of sine and an angular component in terms of cosine.

An aspect of the invention also covers a method for locating the position of at least one road object associated with a portion of a road network. The type of the road object is identified from a plurality of geolocated road information items which relate to the road object, the plurality of road information items being obtained from at least one sensor associated with each one of a plurality of road vehicles. The road object is further associated with a plurality of geographic coordinates, each geographic coordinate being calculated from the plurality of road information items associated with one of the plurality of road vehicles. The method comprises the following steps:

a first creation step in which is created, for each type of road object, a first characteristic vector comprising the type of the road object and the associated plurality of geographic coordinates, a first partitioning step in which is partitioned, on the basis of an unsupervised classification algorithm based on distribution density, at least a portion of the set of first characteristic vectors into a plurality of classes, and a calculating step in which is calculated, for each class, at least one measure of central tendency from the geographic coordinates associated with the class, the measure of central tendency being representative of the position of the road object.

In one particular implementation of the invention, the method further comprises the following steps, for each class, a second creation step in which is created a second characteristic vector comprising at least one component for each geographic coordinate of the class, each component being representative of an azimuth angle of a direction of observation of the road object associated with the corresponding geographic coordinate, a second partitioning step in which is partitioned, on the basis of the unsupervised classification algorithm based on distribution density, at least a portion of the set of second characteristic vectors into a plurality of subclasses, and in which is further calculated, in the calculating step, for each subclass, at least one measure of central tendency from the geographic coordinates associated with the subclass, the measure of central tendency being representative of the position of the road object in a direction of observation of the road object.

In a first embodiment, the first creation step further comprises a first separation step in which each geographic coordinate is separated into a position component in terms of latitude and a position component in terms of longitude.

In a second embodiment, the second creation step further comprises a second separation step in which each azimuth angle is separated into an angular component in terms of sine and an angular component in terms of cosine.

In one exemplary implementation of the system and of the method, the unsupervised classification algorithm based on distribution density is of a type chosen from: DBSCAN, OPTICS, CLARANS, DENCLUE and CLIQUE.

In another implementation of the system and of the method, the measure of central tendency of a class or of a subclass is chosen from: the centroid and the medoid.

BRIEF DESCRIPTION OF THE FIGURES

Other features and advantages of aspects of the invention will be better understood on reading the following description with reference to the appended drawings, which are non-limiting and given by way of illustration.

FIG. 2 shows, according to an aspect of the invention, a system for locating the position of at least one road object in the road scene of FIG. 1.

FIG. 3 shows a method implemented by the computing unit of the system of FIG. 2.

DETAILED DESCRIPTION OF THE PREFERRED EMBODIMENTS

Figure 1:
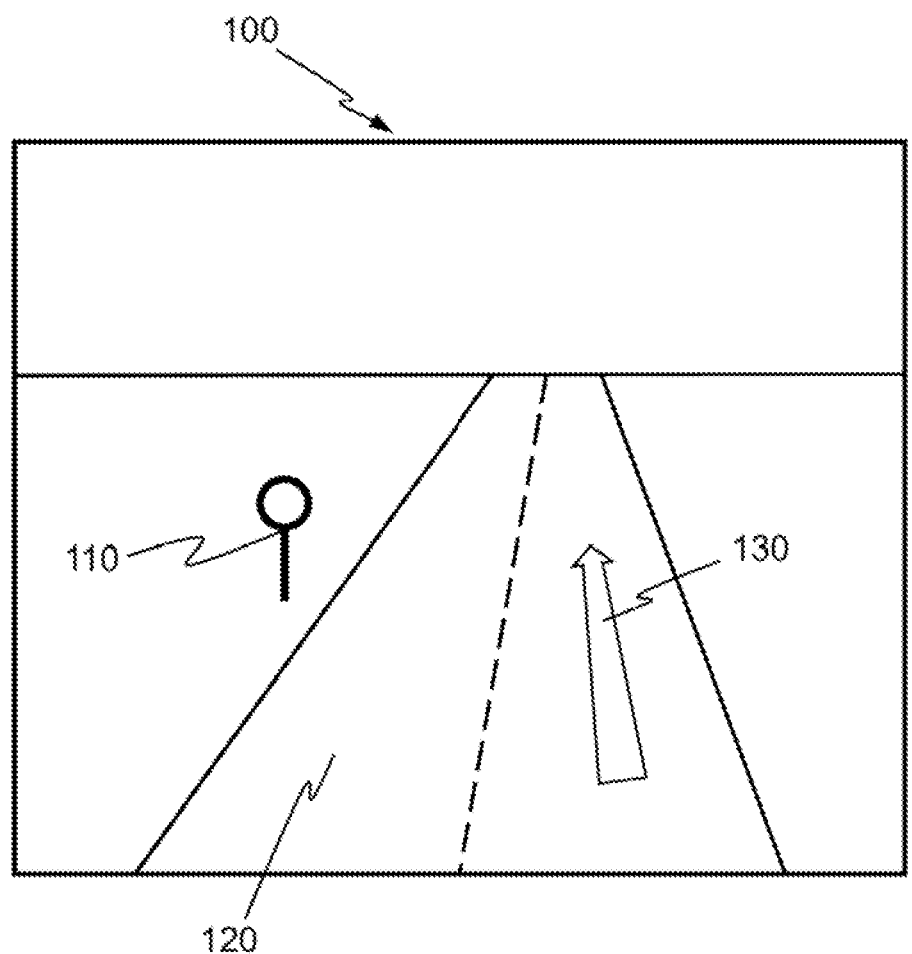
FIG. 1 shows a road scene.

For the sake of clarity, the elements shown have not necessarily been drawn to the same scale, compared to one another, unless otherwise indicated.

In order to overcome the problems of the prior art, it has been envisaged to make use of the entirety of a fleet of road vehicles and to bring together the various information items collected in order to rule out false positives and correct the imprecision of GPS-type systems via mass effect.

More precisely, the general principle of an aspect of the invention is based on determining the position of a road object using unsupervised machine learning and more particularly unsupervised classification based on distribution density (density-based clustering). What is meant by road object is any object associated with a portion of a road network, either permanently or temporarily. This may be, for example, a vertical signage object (e.g. a traffic sign) or a horizontal signage object (e.g. a road marking, a speed bump, a traffic circle). This may also be an irregularity on the roadway (e.g. a pothole, an area of ice) or an event associated with the portion of the road network (e.g. an accident).

In an aspect of the invention, it is considered that a road object is associated with a plurality of geographic coordinates which have been obtained from a plurality of road information items associated with a plurality of road vehicles, in circulation on the portion of a road network. To that end, the road vehicles, according to an aspect of the invention, are provided with at least one sensor capable of acquiring geolocated road information items which relate to the road object. For example, the sensor may be an image sensor or a suspension sensor of the road vehicle. What is meant by road vehicle is any vehicle equipped with an engine or motor (generally an internal combustion engine or electric motor) intended to move it on a road network and capable of transporting people or loads (for example, a car, a truck or a motorcycle).

Thus, an aspect of the invention proposes determining the most probable position of a road object by applying unsupervised classification based on distribution density to the plurality of geographic coordinates associated with the type of the road object. In this context, the unsupervised classification based on distribution density corresponds to a machine learning model of descriptive type in which a partition of a set of observations is automatically discovered, such that the observations within the same class (clusters) are similar and that the observations belonging to two different classes are different.

In practice, in an aspect of the invention, the unsupervised classification based on distribution density is applied in a two-phase approach.

In the first phase, called geographic classification, the unsupervised classification based on distribution density is applied a first time to the plurality of geographic coordinates associated with the type of the road object so as to automatically group it into homogeneous classes. Next, in the second phase, called angular classification, the unsupervised classification based on distribution density is applied a second time to each class produced in the first phase, so as to automatically group it into homogeneous subclasses based on the azimuth angles of the road object that are associated with the geographic coordinates of the class.

FIG. 1 illustrates, according to an aspect of the invention, an image showing a road scene 100 acquired by an image sensor (not shown) which is coupled to a road vehicle (not shown). The road scene 100 comprises a road object 110 associated with a portion of a road network 120. In one particular implementation, the road scene 100 comprises a plurality of road objects 110. In FIG. 1, the image was acquired while the road vehicle was traveling in the direction of travel 130.

FIG. 2 illustrates a system 200 for locating the position of at least one road object 110 in the road scene 100. The system 200 comprises a road information receiving unit 210, a road information processing unit 220, and a computing unit 230 which are functionally coupled to one another. In one particular implementation, the road information receiving unit 210, the road information processing unit 220 and the computing unit 230 are included in a single processor-type processing unit.

In FIG. 2, the road information receiving unit 210 is configured to receive a plurality of road information items $I_i$, of image type, which relate to the road scene 100. In one particular implementation, the road information receiving unit 210 is a processor of known type. As mentioned above, the plurality of road information items $I_i$ is obtained from at least one sensor associated with each one of a plurality of road vehicles. In the example of FIG. 2, the sensor is of the image sensor type. In another example, the sensor is a sensor of the type for sensing the physical characteristics of a road vehicle, such as a suspension sensor, a radar/lidar sensor or an obstacle sensor.

In FIG. 2, the road information processing unit 220 is configured to identify the type of the road object 110 from the plurality of road information items $I_i$. In one particular implementation, the road information processing unit 220 is a processor of known type configured to execute a known algorithm for recognizing road objects 110 within one or more images. In one example of this implementation, the type of the road object 110 corresponds to a type of vertical signage for indicating a hazard, for signaling a prohibition or an obligation, or for giving advice and information. In this example, if the road scene 100 comprises a road object 110 indicating a traffic speed limited to 70 km/h and another road object 110 indicating a traffic speed limited to 50 km/h, then it will be considered that the road scene 100 comprises two types of road objects 110 which are different. In another example, the type of the road object 110 corresponds to a type of horizontal signage such as drawings, arrows, lines and text on the roadway.

In another particular implementation, the road information processing unit 220 is a processor of known type configured to execute a known algorithm for recognizing road objects 110 from measurements of physical characteristics of a road vehicle. In one example of this implementation, the type of the road object 110 corresponds to an irregularity on the roadway, a speed bump or a traffic circle. Thus, for example, the road information processing unit 220 may deduce the presence of a pothole or of a speed bump from measurements from a suspension sensor of the road vehicle.

The road information processing unit 220 is further configured to calculate a plurality of geographic coordinates associated with the road object 110, each geographic coordinate being calculated from the plurality of road information items $I_i$ associated with one of the plurality of road vehicles. Specifically, in an aspect of the invention, it is considered that the plurality of road information items $I_i$ associated with each road vehicle is geolocated. Thus, from the plurality of road information items $I_i$ from each road vehicle, the road information processing unit 220 may estimate the geographic position of the road object 110.

It is here that the problem addressed by an aspect of the invention lies. Specifically, it has been observed that for one and the same road object 110, the plurality of road information items $I_i$ that is associated with each one of the plurality of road vehicles produces substantially different geographic coordinates. Thus, in this case, there is some uncertainty as to the actual position of a road object 110.

To solve this problem, in FIG. 2, the computing unit 230 is configured to implement a method 300 illustrated in FIG. 3.

In practice, the computing unit 230 is configured to create, in a first creation step 310, for each type of road object 110, a first characteristic vector comprising the type of the road object 110 and the plurality of geographic coordinates associated with the road object 110.

Furthermore, the computing unit 230 is configured to partition, in a first partitioning step 320, on the basis of an unsupervised classification algorithm based on distribution density, at least a portion of the set of first characteristic vectors into a plurality of homogeneous classes.

In one example of an aspect of the invention, the unsupervised classification algorithm based on distribution density is of a type chosen from: DBSCAN, OPTICS, CLARANS, DENCLUE and CLIQUE. In addition, if necessary, and depending on the algorithm used, it is possible to optimize the hyperparameters of these algorithms so as to obtain classes which are clearly distinct from one another. To that end, in one example, hyperparameters are optimized alone or in combination which make it possible to maximize the number of classes. This has the effect of preventing geographic coordinates associated with road objects 110 that are different, but that are physically close, from being merged into the same class.

In one particular implementation of an aspect of the invention, the computing unit 230 is further configured to separate, in a first separation step 311 of the first creation step 310, each geographic coordinate into a position component in terms of latitude and a position component in terms of longitude. Thus, in this geographic classification phase, three-dimensional classification is carried out, since the type of road object 110, the latitude and the longitude of the road object 110 are considered.

Subsequently, for each class, subclassification is carried out in order to take into account the direction of travel of the road vehicle from which the road object 110 was identified. To that end, the computing unit 230 is configured to create, in a second creation step 330, a second characteristic vector comprising at least one component for each geographic coordinate of the class, each component being representative of an azimuth angle of a direction of observation of the road object 110 associated with the corresponding geographic coordinate. What is meant by azimuth is the position of the road object 110 with respect to north.

In one particular implementation of an aspect of the invention, the computing unit 230 is further configured to separate, in a second separation step 331 of the second creation step 330, each azimuth angle into an angular component in terms of sine and an angular component in terms of cosine. In this implementation, the azimuth angle is considered to be expressed in radians. If the azimuth angle is expressed in degrees, it should be converted into radians beforehand. Thus, in this angular classification phase, two-dimensional classification is carried out, since the sine and the cosine of the azimuth angle associated with a geographic coordinate of the road object 110 are considered.

Furthermore, the computing unit 230 is configured to partition, in a second partitioning step 340, on the basis of the unsupervised classification algorithm based on distribution density, at least a portion of the set of second characteristic vectors into a plurality of subclasses.

Lastly, the computing unit 230 is configured to calculate, in a calculating step 350, for each subclass, at least one measure of central tendency from the geographic coordinates associated with the subclass, the measure of central tendency being representative of the position of the road object 110 in a direction of observation of the road object 110.

In one example of an aspect of the invention, the measure of central tendency of a subclass is chosen from: the centroid and the medoid. What is meant by centroid is the mean vector of all of the elements of a subclass. What is meant by medoid is the most central element of a subclass.

In one particular embodiment of the invention, the subclassification step is not carried out. This may be necessary according to a predetermined type of road object, for which taking into account the direction of travel of the road vehicle is not necessary. For example, this may be the case when the road object corresponds to an irregularity on the roadway which is the same in all directions of travel. In this particular embodiment, the computing unit 230 is configured to calculate, in the calculating step 350, for each class, at least one measure of central tendency from the geographic coordinates associated with the class, the measure of central tendency being representative of the position of the road object 110.

In another particular embodiment of the invention, the various steps of the method 300 are defined by computer program instructions. Therefore, an aspect of the invention is also aimed at a program with a computer program code stored on a non-transient storage medium, this program code being capable of executing the steps of the method 300 when the computer program is loaded into the computer or run on the computer.

An aspect of the present invention has been described and illustrated via the present detailed description and via the figures. However, an aspect of the present invention is not limited to the presented embodiments. Thus, after reading the present description and studying the appended drawings, those skilled in the art will be able to deduce and implement other embodiments and variants.

The invention claimed is:

1. A vehicle system for locating the position of at least one road object associated with a portion of a road network on which the vehicle is traveling, the vehicle system comprising:
   at least one vehicle sensor for sensing a road object; and
   a vehicle processor configured to:
      receive a plurality of geolocated road information items which relate to the road object, the plurality of road information items being obtained from the at least one sensor of the vehicle, and received from a plurality of road vehicles,
      identify the type of the road object from the plurality of road information items and calculate a plurality of geographic coordinates associated with the road object, each geographic coordinate being calculated from the plurality of road information items,
      create, in a first creation step, for each type of road object, a first characteristic vector comprising the type of the road object and the associated plurality of geographic coordinates,
      partition, in a first partitioning step, on the basis of an unsupervised classification algorithm based on distribution density of the plurality of geographic coordinates in the first characteristic vector for each type of the road object, at least a portion of the set of first characteristic vectors into a plurality of classes, and
      for each class determined in the first partitioning step:
         create, in a second creation step, a second characteristic vector comprising at least one component for each geographic coordinate of the class, each component being representative of an azimuth angle of a direction of observation of the road object associated with the corresponding geographic coordinate, partition, in a second partitioning step, on the basis of the unsupervised classification algorithm based on distribution density of the plurality of geographic coordinates in the second characteristic vector for each type of the road object, at least a portion of the set of second characteristic vectors into a plurality of subclasses, and
         calculate, in a calculating step, for each subclass, at least one measure of central tendency from the geographic coordinates associated with the subclass, the measure of central tendency being representative of the position of the road object in a direction of observation of the road object as indicated by the azimuth angle of the direction of observation of the road object; and
      control the vehicle based on the measure of central tendency of the road object.

2. The system as claimed in claim 1, wherein the vehicle processor is further configured to separate, in a first separation step of the first creation step, each geographic coordinate into a position component in terms of latitude and a position component in terms of longitude.

3. The system as claimed in claim 1, wherein the vehicle processor is further configured to separate, in a second separation step of the second creation step, each azimuth angle into an angular component in terms of sine and an angular component in terms of cosine.

4. A vehicle method for locating the position of at least one road object associated with a portion of a road network on which the vehicle is traveling, the type of road object of which is identified from a plurality of geolocated road information items which relate to the road object, the plurality of road information items being obtained from at least one vehicle sensor associated with each one of a plurality of road vehicles, the road object further being associated with a plurality of geographic coordinates, each geographic coordinate being calculated, by a vehicle processor, from the plurality of road information items associated with one of the plurality of road vehicles, the method comprising:
   receiving, by the processor, a plurality of geolocated road information items which relate to the road object, the plurality of road information items being obtained from the at least one sensor of the vehicle, and received from a plurality of road vehicles, identifying, by the processor, the type of the road object from the plurality of road information items and calculating a plurality of geographic coordinates associated with the road object, each geographic coordinate being calculated from the plurality of road information items,
   executing, by the processor, a first creation step in which is created, for each type of road object, a first characteristic vector comprising the type of the road object and the associated plurality of geographic coordinates,
   executing, by the processor, a first partitioning step in which is partitioned, on the basis of an unsupervised classification algorithm based on distribution density of the plurality of geographic coordinates in the first characteristic vector for each type of the road object, at least a portion of the set of first characteristic vectors into a plurality of classes, for each class determined in the partitioning step:
- executing, by the processor, a second creation step in which is created a second characteristic vector comprising at least one component for each geographic coordinate of the class, each component being representative of an azimuth angle of a direction of observation of the road object associated with the corresponding geographic coordinate,
- executing, by the processor, a second partitioning step in which is partitioned, on the basis of the unsupervised classification algorithm based on distribution density of the plurality of geographic coordinates in the second characteristic vector for each type of the road object, at least a portion of the set of second characteristic vectors into a plurality of subclasses,
- executing, by the processor, in a calculating step, for each subclass, at least one measure of central tendency from the geographic coordinates associated with the subclass, the measure of central tendency being representative of the position of the road object in a direction of observation of the road object as indicated by the azimuth angle of the direction of observation of the road object, and control the vehicle based on the measure of central tendency of the road object.

5. The method as claimed in claim 4, wherein the first creation step further comprises a first separation step in which each geographic coordinate is separated into a position component in terms of latitude and a position component in terms of longitude.

6. The method as claimed in claim 4, wherein the second creation step further comprises a second separation step in which each azimuth angle is separated into an angular component in terms of sine and an angular component in terms of cosine.

7. The method as claimed in claim 4, wherein the unsupervised classification algorithm based on distribution density is of a type chosen from: DBSCAN, OPTICS, CLARANS, DENCLUE and CLIQUE.

8. The method as claimed in claim 4, wherein the measure of central tendency of a class or of a subclass is chosen from: a centroid and a medoid.

9. The system as claimed in claim 1, wherein the unsupervised classification algorithm based on distribution density is of a type chosen from: DBSCAN, OPTICS, CLARANS, DENCLUE and CLIQUE.

10. The system as claimed in claim 1, wherein the measure of central tendency of a class or of a subclass is chosen from: a centroid and a medoid.

11. The system as claimed in claim 2, wherein the vehicle processor is further configured to separate, in a second separation step of the second creation step, each azimuth angle into an angular component in terms of sine and an angular component in terms of cosine.

12. The method as claimed in claim 5, wherein the second creation step further comprises a second separation step in which each azimuth angle is separated into an angular component in terms of sine and an angular component in terms of cosine.

* * * * *